US011353399B2

(12) United States Patent
Sakamoto et al.

(10) Patent No.: US 11,353,399 B2
(45) Date of Patent: Jun. 7, 2022

(54) OPTICAL WAVEGUIDE, OPTICAL CONCENTRATION MEASURING DEVICE, AND METHOD FOR MANUFACTURING OPTICAL WAVEGUIDE

(71) Applicant: ASAHI KASEI MICRODEVICES CORPORATION, Tokyo (JP)

(72) Inventors: Toshiro Sakamoto, Tokyo (JP); Takaaki Furuya, Tokyo (JP)

(73) Assignee: Asahi Kasel Microdevices Corporation, Tokyo (JP)

( * ) Notice: Subject to any disclaimer, the term of this patent is extended or adjusted under 35 U.S.C. 154(b) by 293 days.

(21) Appl. No.: 16/493,135

(22) PCT Filed: Jan. 25, 2018

(86) PCT No.: PCT/JP2018/002281
§ 371 (c)(1),
(2) Date: Sep. 11, 2019

(87) PCT Pub. No.: WO2018/179752
PCT Pub. Date: Oct. 4, 2018

(65) Prior Publication Data
US 2020/0116631 A1  Apr. 16, 2020

(30) Foreign Application Priority Data

Mar. 30, 2017 (JP) .............................. JP2017-068957

(51) Int. Cl.
*G02B 6/42* (2006.01)
*G01N 21/47* (2006.01)
(Continued)

(52) U.S. Cl.
CPC ....... *G01N 21/552* (2013.01); *G01N 21/3504* (2013.01); *G01N 21/4788* (2013.01);
(Continued)

(58) Field of Classification Search
CPC ............. G01N 21/552; G01N 21/3504; G01N 21/4788; G02B 6/125; G02B 6/4203; G02F 1/2955
See application file for complete search history.

(56) References Cited

U.S. PATENT DOCUMENTS 10,088,628 B1 * 10/2018 Oonawa ............. G02B 6/12004
2004/0101246 A1   5/2004 Kapusta et al.
(Continued)

FOREIGN PATENT DOCUMENTS

EP    0687927 A1 * 12/1995 ......... G02B 6/02295
JP    H09-061346 A    3/1997
(Continued)

OTHER PUBLICATIONS

International Preliminary Report on Patentability dated Oct. 1, 2019, issued in corresponding International Patent Application No. PCT/JP2018/002281.
(Continued)

*Primary Examiner* — David P Porta
*Assistant Examiner* — Jeremy S Valentiner
(74) *Attorney, Agent, or Firm* — Morgan, Lewis & Bockius LLP

(57) ABSTRACT

It is an object of this invention to provide an optical waveguide, an optical concentration measuring device, and a method for manufacturing an optical waveguide capable of achieving an improvement of evanescent wave exuding efficiency of propagating light and light extraction efficiency. A core layer provided in an optical waveguide has a first portion having a first film thickness, a second portion having a second film thickness different from the first film thickness, and a third portion connecting the first portion and the second portion. The third portion is formed so that the film thickness is gradually increased from the second portion (Continued)

having the smaller film thickness toward the first portion having the larger film thickness between the first portion and the second portion, and the maximum inclination angle is 10° or more and 45° or less.

20 Claims, 13 Drawing Sheets

(51) Int. Cl.
*G02F 1/295* (2006.01)
*G02B 6/125* (2006.01)
*G01N 21/552* (2014.01)
*G01N 21/3504* (2014.01)

(52) U.S. Cl.
CPC ............ *G02B 6/125* (2013.01); *G02B 6/4203* (2013.01); *G02F 1/2955* (2013.01)

(56) References Cited

U.S. PATENT DOCUMENTS

| 2009/0263073 | A1 | 10/2009 | Shioda | |
| 2010/0067846 | A1* | 3/2010 | Tokushima | G02B 6/136 385/14 |
| 2010/0086255 | A1 | 4/2010 | Ishizaka | |
| 2014/0270642 | A1* | 9/2014 | Frish | G02B 6/122 385/37 |
| 2015/0086153 | A1 | 3/2015 | Ono et al. | |
| 2015/0211960 | A1* | 7/2015 | Shimizu | G01M 11/35 356/73.1 |
| 2015/0309261 | A1 | 10/2015 | Kobyakov et al. | |
| 2016/0223748 | A1 | 8/2016 | Ono et al. | |
| 2017/0227456 | A1* | 8/2017 | Tao | G02B 6/122 |

FOREIGN PATENT DOCUMENTS

| JP | 2001-135887 A | 5/2001 |
| JP | 2003-167140 A | 6/2003 |
| JP | 2005-062298 A | 3/2005 |
| JP | 2005-070557 A | 3/2005 |
| JP | 2005-300212 A | 10/2005 |
| JP | 2006-508398 A | 3/2006 |
| JP | 2006-171078 A | 6/2006 |
| JP | 2010-271369 A | 12/2010 |
| JP | 2011-043699 A | 3/2011 |
| JP | 2011-197453 A | 10/2011 |
| JP | 2015-084081 A | 4/2015 |
| WO | 2007/026601 A1 | 3/2007 |
| WO | 2008/066160 A1 | 6/2008 |
| WO | 2008/111447 A1 | 9/2008 |

OTHER PUBLICATIONS

Emmons et al., "Buried-Oxide Silicon-on-Insulator Structures II: Waveguide Grating Couplers", IEEE Journal of Quantum Electronics, Jan. 1992, vol. 28, No. 1. pp. 164-175.

Hattasan et al., "High-Efficiency SOI Fiber-to-Chip Grating Couplers and Low-Loss Waveguides for the Short-Wave Infrared", IEEE Photonics Technology Letters, Sep. 1, 2012, vol. 24, No. 17, pp. 1536-1538.

International Search Report issued in corresponding International Patent Application No. PCT/JP2018/002281, dated Apr. 24, 2018.

* cited by examiner

FIG. 3
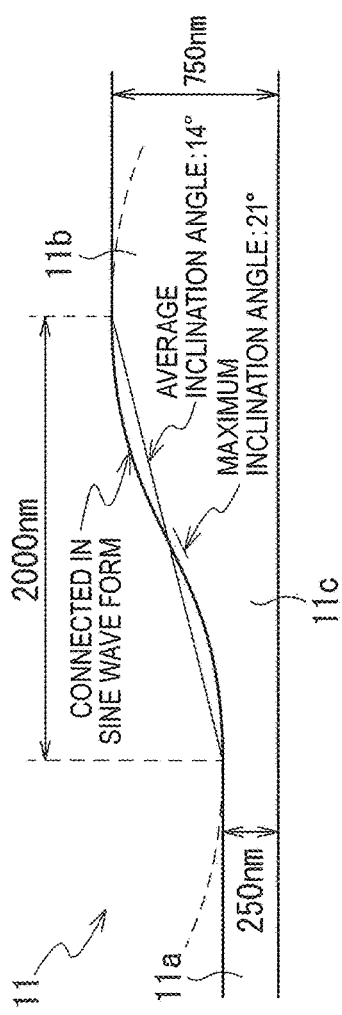
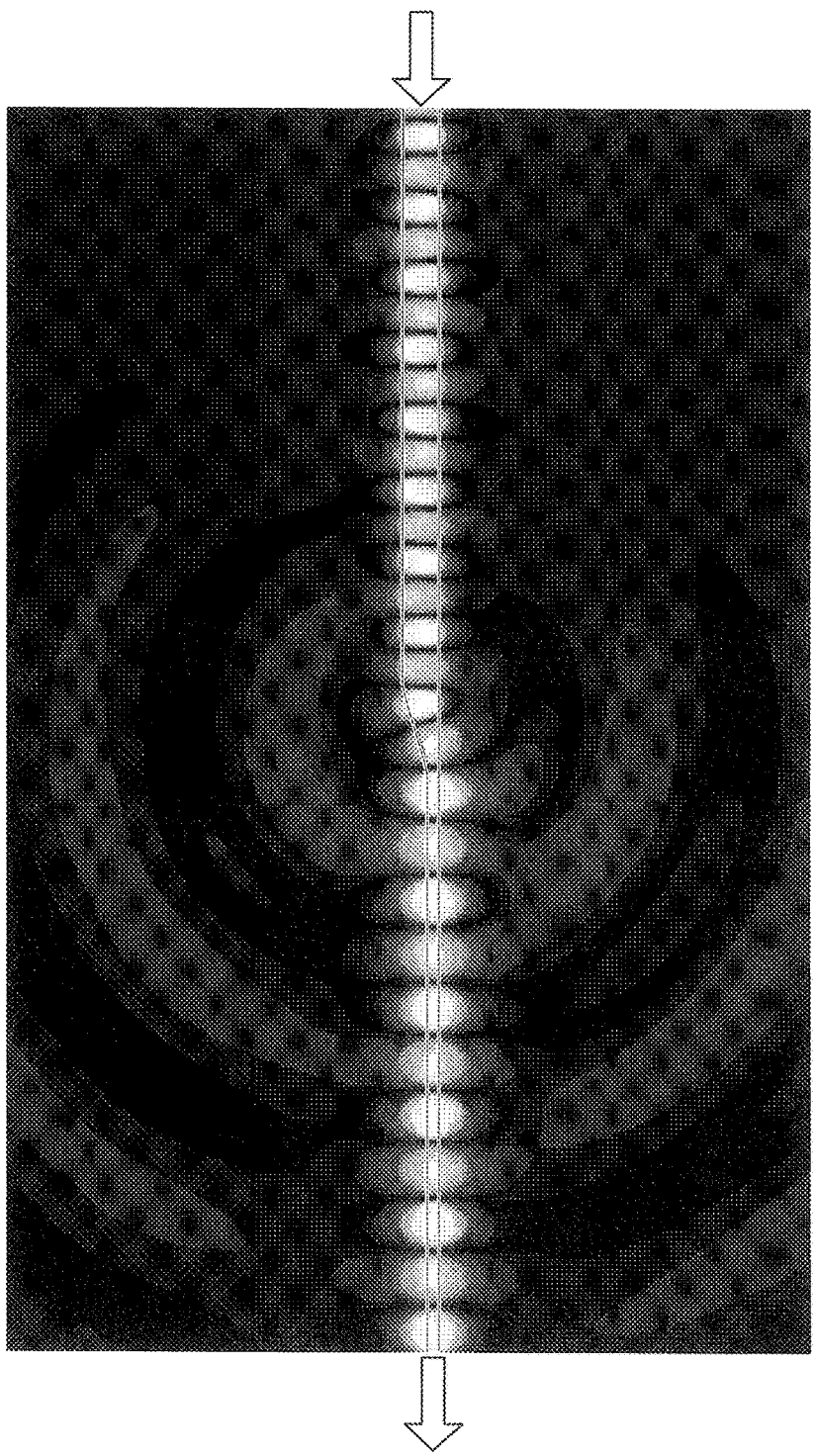

OPTICAL WAVEGUIDE, OPTICAL CONCENTRATION MEASURING DEVICE, AND METHOD FOR MANUFACTURING OPTICAL WAVEGUIDE

TECHNICAL FIELD

The present invention relates to an optical waveguide, an optical concentration measuring device, and a method for manufacturing an optical waveguide.

BACKGROUND ART

Light propagating through the inside of a structure, such as a thin film formed of a crystal or the like, travels while repeating total reflection on the interface with the outside of the structure when the refractive index of a material forming the structure is larger than the refractive index of a material outside the structure. When totally reflecting on the interface, the light propagating through the structure exudes out to the outside where the refractive index is small. This exudation is referred to as an evanescent wave (see FIG. 13). The evanescent wave can be absorbed by a substance adjacent to the structure in a process where the light is propagating. Therefore, detection, identification, and the like of the substance in contact with the structure can be achieved from intensity changes of the light propagating through the structure. An analysis method utilizing the principle of the evanescent wave described above is referred to as an Attenuated Total Reflection Method (ATR) and is utilized for chemical composition analysis of the substance, for example. It is common to use an infrared ray as the light to be propagated. Since substances have a characteristic of selectively absorbing an infrared ray of a specific wavelength, the analysis or the sensing of the substances can be achieved by propagating an infrared ray matched to the absorption spectrum of a substance to be measured.

PTL 1 has proposed an optical waveguide sensor in which the ATR method is applied to the sensor. The optical waveguide sensor is configured so that a core layer is formed on a substrate to pass light and a substance in contact with the core layer is detected utilizing the evanescent wave.

The sensor utilizing the ATR method can improve the sensor sensitivity by increasing the amount of interaction between the evanescent wave and the substance to be measured. In order to increase the evanescent wave, a reduction in the film thickness of the core layer through which light propagates is required.

On the other hand, as illustrated in FIG. 13, the sensor utilizing the ATR method requires a portion of introducing light L from a light source (not illustrated) into a core layer 51 of an optical waveguide and a portion of extracting the light L from the core layer 51 of the optical waveguide toward a photodetector (not illustrated). Therefore, a grating is provided each between the light source and the optical waveguide and between the photodetector and the optical waveguide in order to bend the optical axis of the light L in many cases. In that case, when the loss of the light L in the grating is less, the intensity of a signal detected with the photodetector can be obtained to a large extent, so that the sensitivity increases as a sensor.

NPL 1 and PTL 2 disclose the design plan of gratings for improving the light extraction efficiency in the gratings. NPL 1 discloses improving the light extraction efficiency in the grating by setting the thickness of the core layer configuring the grating to the integral multiple of ½ of the wavelength of light in a material configuring the core layer. By designing the film thickness of the core layer as described above, the phase of light directly scattered upward by concavities and convexities of the surface of the core layer and the phase of light which is scattered downward, reflected on the rear surface of the core layer, and then returned are aligned, and therefore the light extraction efficiency in the grating improves. Moreover, PTL 2 discloses that there is an optimal value for each of the groove period and the groove depth of the grating. By setting the groove period of the grating to 0.4 times the propagation wavelength of light and setting the groove depth to 0.097 times the propagation wavelength of light, light can be extracted most efficiently both in a TE mode and an MT mode.

CITATION LIST

Patent Literatures

PTL 1: JP 2005-300212 A
PTL 2: JP 2011-43699 A

Non Patent Literature

NPL 1: R. M. Emmons and D. G. Hall, "Buried-Oxide Silicon-on-Insulator Structures II: Waveguide Grating Couplers", IEEE JOURNAL OF QUANTUM ELECTRONICS, Vol 0.28, NO. 1, JANUARY 1992, pp. 164-175.

SUMMARY OF INVENTION

Technical Problem

It is an object of the present invention to provide an optical waveguide, an optical concentration measuring device, and a method for manufacturing an optical waveguide capable of improving the evanescent wave exuding efficiency of propagating light and light extraction efficiency.

Solution to Problem

In order to achieve the above-described object, an optical waveguide according to an aspect of the present invention is provided with a core layer capable of propagating light and having a first portion having a first film thickness, a second portion having a second film thickness different from the first film thickness, and a third portion connecting between the first portion and the second portion, in which, in the third portion, the film thickness is gradually increased from a small film thickness side toward a large film thickness side between the first portion and the second portion, and the maximum inclination angle is 10° or more and 45° or less.

In order to achieve the above-described object, an optical waveguide according to another aspect of the present invention is provided with a core layer capable of propagating light and having a first portion having a first film thickness, a second portion having a second film thickness different from the first film thickness, and a third portion connecting between the first portion and the second portion, in which the first portion has a grating portion, the second portion has a light propagation portion, and, in the third portion, the film thickness is gradually increased from a small film thickness side toward a large film thickness side between the first portion and the second portion.

In order to achieve the above-described object, an optical concentration measuring device according to an aspect of the present invention is provided with the optical waveguide described in any one of the aspects of the present invention, a light source capable of making light incident on the core layer, and a detection unit capable of receiving light propagating through the core layer.

In order to achieve the above-described object, a method for manufacturing an optical waveguide according to an aspect of the present invention includes selectively forming an oxide film on the surface of a core layer capable of propagating light by a thermal oxidation method and forming two portions different in film thickness in the core layer by removing the oxide film by etching.

In order to achieve the above-described object, a method for manufacturing an optical waveguide according to another aspect of the present invention includes selectively forming a groove in a core layer capable of propagating light by etching and forming an inclined structure in which the film thickness of the core layer is gradually increased from a bottom portion of the groove toward a top portion of the groove by performing heat treatment in a hydrogen atmosphere.

Advantageous Effects of Invention

According to the aspects of the present invention, an improvement of the evanescent wave exuding efficiency of propagating light and the light extraction efficiency can be achieved.

BRIEF DESCRIPTION OF DRAWINGS

FIG. 3 is a figure explaining the optical waveguide 10 according to one embodiment of the present invention and illustrates a simulation result (No. 2) indicating the leakage of light to the outside of the core layer 11 in a connection portion of the core layer 11 having the different film thickness regions;

DESCRIPTION OF EMBODIMENTS

Figure 1:
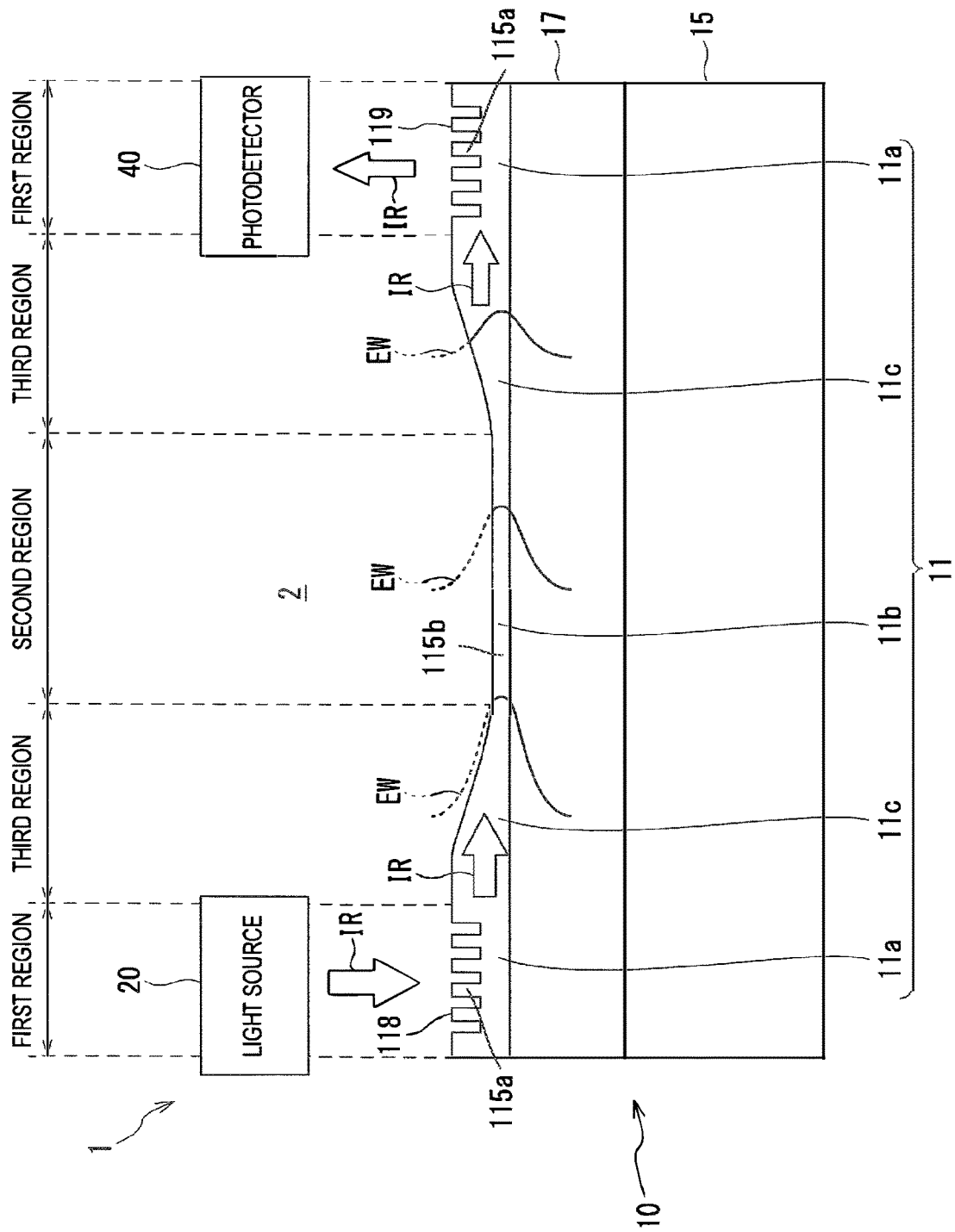
FIG. 1 is a figure illustrating the schematic configuration of an optical waveguide 10 and an optical concentration measuring device 1 according to one embodiment of the present invention and the sensing by an AIR method utilizing the optical concentration measuring device 1.

Hereinafter, the present invention is described through embodiments of the invention but the following embodiments do not limit the invention claimed in Claims. Moreover, all the combinations of the features described in the embodiments are not necessarily indispensable for the solution means of the invention.

<Optical Waveguide>

An optical waveguide according to one embodiment of the present invention is provided with a core layer capable of propagating light. The core layer has a first portion having a first film thickness, a second portion having a second film thickness different from the first film thickness, and a third portion connecting the first portion and the second portion. In the third portion, the film thickness is gradually increased from a small film thickness side toward a large film thickness side between the first portion and the second portion, and the maximum inclination angle is 10° or more and 45° or less.

Herein, the maximum inclination angle is determined according to the following procedure by performing cross section viewing of the optical waveguide in the cross section including the first portion, the second portion, and the third portion.

First, the dimension in the horizontal direction of the third portion is divided by a 5% to 25% value of a difference between the film thickness of the first portion and the film thickness of the second portion.

Next, the shape of the edge of the third portion in each divided horizontal section is approximated by a linear function. For the approximation by a linear function, the end points of the third portion in a certain horizontal section are connected by a line.

Herein, the angle of the linear function having the largest inclination with respect to the horizontal direction among the linear functions of the sections is defined as the maximum inclination angle.

With respect to a method for calculating the maximum inclination angle described above, the maximum inclination angle can be calculated by image analysis using a scanning electron microscope (SEM) or a transmission electron microscope (TEM).

For example, when a difference between the film thickness of the first portion and the film thickness of the second portion is 500 nm, the dimension in the horizontal direction of the third portion is divided into sections at an interval of 25 nm to 125 nm, and then the shape of the edge of the third portion in each divided horizontal section is approximated by a linear function. Then, the angle of the linear function having the largest inclination with respect to the horizontal direction among the linear functions of the sections is defined as the maximum inclination angle.

Due to the fact that the maximum inclination angle is 45° or less, the optical waveguide according to the embodiment of the present invention can provide an optical waveguide excellent both in evanescent wave exuding efficiency of propagating light and light extraction efficiency. More specifically, the optical waveguide according to the embodiment of the present invention can achieve an improvement of the evanescent wave exuding efficiency of propagating light and the light extraction efficiency.

The average inclination angle of the third portion may be 30° or less.

Herein, the average inclination angle is determined according to the following procedure by performing cross section viewing of the optical waveguide in the cross section including the first portion, the second portion, and the third portion.

First, in the line forming the edge of the third portion, a point where the film thickness varies by 5% of the total difference (difference between the film thickness of the first portion and the film thickness of the second portion) from the first portion is set as a starting point and a point where the film thickness varies by 5% of the total difference from the second portion is set as an end point.

Next, the starting point and the end point described above are connected by a line, and then the inclination angle with respect to the horizontal direction of the line is defined as the average inclination angle.

For example, when the difference between the film thickness of the first portion and the film thickness of the second portion is 500 nm, a point where the film thicknesses varies by 25 nm from the first portion is set as the starting point and a point where the film thicknesses varies by 25 nm from the second portion is set as the end point in the line forming the edge of the third portion, and then the starting point and the end point are connected by a line. The angle with respect to the horizontal direction of the line is calculated as the average inclination angle.

With respect to a method for calculating the average inclination angle described above, the average inclination angle can be calculated by image analysis using a scanning electron microscope (SEM) or a transmission electron microscope (TEM).

Thus, also when the maximum inclination angles are almost the same, the light extraction efficiency of the optical waveguide can be further improved.

Hereinafter, constituent elements configuring the optical waveguide are described giving specific examples.

<Core Layer>

The core layer is not particularly limited insofar as light can be propagated. Specifically, core layers made of silicon (Si), gallium arsenide (GaAs), and the like are mentioned.

The core layer has the first portion having the first film thickness, the second portion having the second film thickness different from the first film thickness, and the third portion connecting the first portion and the second portion. In the third portion, the film thickness is gradually increased from a small film thickness side toward a large film thickness side between the first portion and the second portion, and the maximum inclination angle is 10° or more and 45° or less. When the first film thickness and the second film thickness are different from each other, the magnitude relationship between the first film thickness and the second film thickness does not matter.

The average inclination angle of the third portion may be 30° or less. Thus, also when the maximum inclination angles are almost the same, the light extraction efficiency of the optical waveguide can be further improved.

The first portion may have a grating portion and the second portion may have a light propagation portion. Thus, the evanescent wave exuding efficiency when light propagates through the second portion and the extraction efficiency in extracting light from the first portion can be improved.

Herein, the grating portion means a portion where concavities and convexities are formed in a specific period (a plurality of periods may be acceptable) in the surface of the core layer. Alternately, when the cross section of the optical waveguide is viewed in the plane including recessed portions and projection portions, the optical waveguide may be in a state where the grooves of the recessed portions of the concavities and convexities are deep and the core layer is separated. In that case, the projection portions are discontinuously formed in an island shape.

The grating portion has the recessed portions. The depth of the recessed portions may be larger than the film thickness of the light propagation portion of the core layer. This is because it is preferable that the light propagation portion of the core layer is sufficiently smaller than the propagation wavelength in order to efficiently exude an evanescent wave from the core layer but, in a region where light is bent by the grating, the light can be efficiently diffracted when the grating is formed with a dimension (herein groove depth) of the order close to the wavelength. More specifically, increasing the depth of the recessed portions of the grating portion to be larger than the film thickness of the light propagation portion of the core layer leads to an improvement of the sensor sensitivity of a sensor using the evanescent wave.

The grating portion has the recessed portions. The film thickness of the recessed portions may be larger than the film thickness of the light propagation portion of the core layer. This is because it is preferable that the light propagation portion of the core layer is sufficiently smaller than the propagation wavelength in order to efficiently exude an evanescent wave from the core layer but, in a region where light is bent by the grating, the light can be efficiently diffracted due to the presence of the grating with a dimension (herein recessed portion film thickness) of the order close to the wavelength. More specifically, increasing the film thickness of the recessed portions of the grating portion to be larger than the film thickness of the light propagation portion of the core layer leads to an improvement of the sensor sensitivity of a sensor using the evanescent wave.

The average film thickness of the grating portion may be larger than the film thickness of the light propagation portion of the core layer. This is because it is preferable that the light propagation portion of the core layer is sufficiently smaller than the propagation wavelength in order to efficiently exude an evanescent wave from the core layer but, in a region where light is bent by the grating, the light can be efficiently diffracted due to the presence of the grating with a dimension (herein average film thickness) of the order close to the wavelength. More specifically, increasing the average film thickness of the grating portion to be larger than the film thickness of the light propagation portion of the core layer leads to an improvement of the sensor sensitivity of a sensor using the evanescent wave.

The grating portion 118, 119 has the projection portions 115a. The film thickness of the projection portions 115a may be larger than the film thickness of the light propagation portion 115b of the core layer 11. This is because it is preferable that the light propagation portion 115b of the core layer 11 is sufficiently smaller than the propagation wavelength in order to efficiently exude an evanescent wave from the core layer 11 but, in a region where light is bent by the grating, the light can be efficiently diffracted due to the presence of the grating with a dimension (herein projection portion film thickness) of the order close to the wavelength. More specifically, increasing the film thickness of the projection portions 115a of the grating portion 118 to be larger than the film thickness of the light propagation portion 115b of the core layer 11 leads to an improvement of the sensor sensitivity of a sensor using the evanescent wave.

The core layer is preferably formed of a single crystal. Thus, a crystal defect in the core layer can be reduced, scattering of propagating light inside the core layer can be inhibited, and a propagation loss can be reduced.

At least a part of the core layer may be provided to be able to contact gas to be measured or liquid to be measured. Moreover, at least a part of the core layer may be provided to be able to contact gas to be measured or liquid to be measured through a film having a film thickness smaller than the wavelength of light propagating through the core layer. Thus, the evanescent wave is interacted with the gas to be measured or the liquid to be measured, so that the concentration of the gas to be measured or the liquid to be measured can be measured.

The light propagating through the core layer may be an infrared ray as an analog signal. The infrared ray as an analog signal means a signal not determining a change of the energy of light with two values of 0 (low level) and 1 (high level) but handling the change amount of the energy of light. Thus, the optical waveguide according to each embodiment is applicable to a sensor or an analyzer. In this case, the wavelength of the infrared ray may be 2 µm or more and 10 µm or less. This wavelength band is a wavelength band which gas typically floating in the environment ($CO_2$, CO, NO, $N_2O$, $SO_2$, $CH_4$, $H_2O$, and the like) absorbs. Thus, the optical waveguide according to each embodiment can be utilized as a gas sensor.

<Substrate>

The substrate is not particularly limited insofar as a support portion and the core layer can be formed on the substrate. Specifically, a silicon substrate, a GaAs substrate, and the like are mentioned.

<Support Portion>

The support portion connects at least a part of the substrate and at least a part of the core layer. The support portion is not particularly limited insofar as the support portion contains a material having a refractive index to the light propagating through the core layer smaller than that of the core layer and is capable of joining the substrate and the core layer. As an example, $SiO_2$ and the like are mentioned as formation materials of the support portion.

As an example of a method for forming the support portion, a buried oxide (BOX) layer ($SiO_2$ layer) of an SOI (Silicon On Insulator) substrate is etched, whereby a structure supporting the core layer (Si layer) by the BOX layer on the substrate (Si layer) can be formed.

<Protective Film>

The optical waveguide according to one embodiment of the present invention may be further provided with a protective film formed on at least apart of the surface of the core layer, having a film thickness of 1 nm or more and less than 20 nm, and having a refractive index smaller than that of the material making the core layer described above. Due to the fact that the film thickness of the protective film is 1 nm or more, the formation of a natural oxide film on the surface of the core layer can be inhibited. Moreover, due to the fact that the film thickness of the protective film is less than 20 nm, the interaction amount of the evanescent wave exuding from the core layer with surrounding gas or liquid is not sharply reduced. Thus, a change of the surface state of the core layer can be prevented without sharply reducing the interaction amount of the evanescent wave exuding from the core layer with surrounding gas or liquid.

The lower limit of the film thickness may be 2 nm. The upper limit of the film thickness may be 5 nm.

As the protective film, a silicon nitride film, a silicon oxynitride film, and the like are specifically mentioned. The protective film may be a monolayer film or may be a multilayer film having a plurality of films.

For example, when the core layer is made of silicon, materials of the protective film may be a silicon nitride film, a silicon oxide film, and a silicon oxynitride film. The film containing nitrogen has an effect of inhibiting oxidation. The silicon oxide film, the silicon nitride film, and the silicon oxynitride film have a refractive index sufficiently smaller than that of silicon, and therefore are excellent also as a formation material of a cladding layer. Particularly, the silicon nitride film or the silicon oxynitride film also hardly absorbs infrared rays. Thus, when the protective film is formed on the surface of the core layer, a reduction in detection sensitivity of the gas to be measured or the liquid to be measured is suppressed.

The protective film may contain nitrogen. Thus, the oxidation of the core layer can be further suppressed. A film containing nitrogen may be a single layer film or may be a multilayer film of a film containing nitrogen and a film not containing nitrogen. When the nitrogen content of the protective film is higher, an oxidation suppression effect becomes higher. The protective film may be a film having a nitrogen content of 1% or more in at least a partial region of the film containing nitrogen.

Herein, when substances, such as silicon, are allowed to stand in the air, a silicon oxide film is naturally formed on the surface in some cases. The natural oxide film has a film thickness of less than 1 nm and does not contain nitrogen, and therefore is distinguished from the protective film in the present invention in these respects.

As a method for forming the protective film, a method, such as deposition by a thermal chemical vapor deposition (CVD) method or oxidation, is usable. In the case of the silicon nitride film, the protective film can be formed using the deposition by the thermal CVD method. In the case of the silicon oxynitride film, the protective film can be formed by oxidation under an atmosphere containing NO or $N_2O$.

<Optical Concentration Measuring Device>

An optical concentration measuring device according to one embodiment of the present invention is provided with the optical waveguide according to one embodiment of the present invention, a light source capable of making light incident on a core layer, and a detection unit capable of receiving light propagating through the core layer.

Hereinafter, constituent elements configuring the optical concentration measuring device are described giving specific examples.

<Light Source>

A light source is not particularly limited, insofar as light can be made incident on the core layer. When infrared rays are used for the measurement of gas, a filament lamp, a ceramic heater, a MEMS (Micro Electro Mechanical Systems) heater, an infrared LED (Light Emitting Diode), and the like are usable as the light source. When ultraviolet rays are used for the measurement of gas, a mercury lamp, an ultraviolet LED, and the like are usable as the light source. When X-rays are used for the measurement of gas, an electron beam, an electron laser, and the like are usable as the light source.

The light propagating through the core layer of the optical waveguide provided in the optical concentration measuring device may be an infrared ray as an analog signal. Herein, the infrared ray as an analog signal means a signal not determining a change of the energy of the light with two values of 0 (low level) and 1 (high level) but handling the change amount of the energy of the light. Thus, the optical concentration measuring device is applicable to a sensor or an analyzer. In this case, the wavelength of the infrared ray may be 2 μm or more and 10 μm or less. This wavelength band is a wavelength band which gas typically floating in the environment ($CO_2$, CO, NO, $N_2O$, $SO_2$, $CH_4$, $H_2O$, and the like) absorbs. Thus, the optical concentration measuring device according to this embodiment is usable as a gas sensor.

<Detection Unit>

The detection unit is not particularly limited insofar as light propagating through the core layer of the optical waveguide can be received. When infrared rays are used for the measurement of gas, a thermal infrared sensor, such as a pyroelectric sensor, a thermopile, or a bolometer, a quantum type infrared sensor, such as a diode or a phototransistor, and the like are usable as the detection unit. When ultraviolet rays are used for the measurement of gas, quantum type ultraviolet sensors, such as a diode and a phototransistor, and the like are usable as the detection unit. When X-rays are used for the measurement of gas, various semiconductor sensors are usable as the detection unit.

<Method for Manufacturing Optical Waveguide>

A method for manufacturing an optical waveguide according to one embodiment of the present invention includes a first process of selectively forming an oxide film on the surface of a core layer capable of propagating light by a thermal oxidation method and a second process of forming two portions different in film thickness in the core layer by removing the oxide film by etching. Thus, a first portion having a first film thickness, a second portion having a second film thickness different from the first film thickness, and a third portion connecting the first portion and the second portion can be formed in the core layer by a simple process.

Before the first process, a process of covering a part of the core layer with a silicon nitride film may be further provided. In a portion covered with the silicon nitride film, the oxidation of the core layer is inhibited. In a portion not covered with the silicon nitride film, the oxidation of the core layer progresses. Therefore, in the core layer, a gentle inclination can be given to the surface of the core layer between a portion where an oxide film has been formed and a portion where no oxide film is formed. A specific manufacturing method is described later.

A second method for manufacturing an optical waveguide according to one embodiment of the present invention includes a first process of selectively forming a groove by etching in a core layer capable of propagating light and a second process of migrating atoms forming the core layer by performing heat treatment in a hydrogen atmosphere to form an inclined structure in which the film thickness of the core layer is gradually increased from a bottom portion of the groove toward a top portion of the groove (i.e., from a valley portion of the groove to a crest portion of the groove). Thus, the first portion having the first film thickness, the second portion having the second film thickness different from the first film thickness, and the third portion connecting the first portion and the second portion can be formed in the core layer by a simple process. A specific manufacturing method is described later.

Embodiment

The optical waveguide according to one embodiment of the present invention is described with reference to FIGS. 1 to 9. First, an optical waveguide 10 according to this embodiment, the optical concentration measuring device 1 provided with the optical waveguide 10, and a method for detecting a substance to be measured by the ATR method using the same are described with reference to FIGS. 1 to 6.

FIG. 1 is a figure illustrating the schematic configuration of the optical concentration measuring device 1 according to this embodiment and is also a conceptual diagram of the ATR method utilizing the optical waveguide 10 according to this embodiment. As illustrated in FIG. 1, the optical concentration measuring device 1 is used by being installed in an external space 2 where gas whose concentration or the like is to be detected is present. The optical concentration measuring device 1 is provided with the optical waveguide 10 according to this embodiment, a light source 20 capable of making light (infrared ray IR in this embodiment) incident on the core layer 11 provided in the optical waveguide 10, and a photodetector (an example of the detection unit) 40 capable of receiving the infrared ray IR propagating through the core layer 11.

The optical waveguide 10 is provided with a substrate 15, the core layer 11 through which the infrared ray IR (an example of the light) can propagate, and a support portion 17 connecting at least a part of the substrate 15 and at least a part of the core layer 11 and supporting the core layer 11 with respect to the substrate 15. The core layer 11 and the substrate 15 are made of silicon (Si), for example. The support portion 17 is made of silica dioxide ($SiO_2$), for example. The substrate 15 and the support portion 17 have a plate shape, for example.

The core layer 11 has first portions 11a having a first film thickness, a second portion 11b having a second film thickness different from the first film thickness, and third portions 11c connecting the first portions 11a and the second portion 11b. The first portions 11a are provided in first regions which are certain regions from each of both ends of the core layer 11 toward the center in the longitudinal direction of the core layer 11. The first portions 11a are provided in two places of the core layer 11, respectively. The second portion 11b is provided in a second region which is a certain region from the center in the longitudinal direction of the core layer 11 toward both the ends. The second portion 11b is provided in one place of the core layer 11. The third portions 11c are provided in third regions which are certain regions between the first regions and the second region. The third portions 11c are also provided in two places of the core layer 11, respectively. Although details are described later, the third portions 11c are formed so that the film thickness is gradually increased from a small film thickness side (second portion 11b side in this embodiment) toward a large film thickness side (first portion 11a side) between the first portion 11a and the second portion 11b, so that the maximum inclination angle is 10° or more and 45° or less. The third portions 11c are formed so that the average inclination angle is 30° or less.

The optical waveguide 10 has a grating coupler (an example of the grating portion) 118 formed in one end portion in the longitudinal direction of the core layer 11 and a grating coupler (an example of the grating portion) 119 formed in the other end portion in the longitudinal direction of the core layer 11. The grating coupler 118 is disposed under the light source 20. The grating coupler 118 is configured to couple an infrared ray IR entering from the light source 20 to an infrared ray IR propagating through the core layer 11. The grating coupler 119 is disposed under the photodetector 40. The grating coupler 119 is configured to extract the infrared ray IR propagating through the core layer 11 and emit the same toward the photodetector 40.

Thus, the first portion 11a disposed on the light source 20 side (light incident side) has the grating coupler 118 and the first portion 11a disposed on the photodetector 40 side (light emission side) has the grating coupler 119. The second portion 11b has a light propagation portion through which the infrared ray IR entering from the grating coupler 118 and to be emitted from the grating coupler 119 propagates. An evanescent wave EW exuding out from the core layer 11 is mainly absorbed by a substance to be measured present in the external space 2 in the second portion 11b having the light propagation portion.

Herein, the core layer 11 is described in detail. It is preferable in the sensor using the ATR method to which the optical waveguide 10 according to this embodiment is applied that a core layer having a small film thickness is formed, so that the amount of the evanescent wave exuding out around the core layer is increased in a region where the evanescent wave is interacted with a substance to be measured. On the other hand, when light is introduced into the core layer or extracted from the core layer, a grating needs to be formed in the core layer. However, when light in a mid-infrared region is efficiently bent, the film thickness of the core layer in the region where the grating is formed and the groove depth of the grating require a certain degree of thickness.

Hence, as illustrated in FIG. 1, in the optical waveguide 10 according to this embodiment, the core layer 11 has the second portion 11b formed so as to have a small film thickness in a region (second region) for exuding the evanescent wave EW to be interacted with the substance to be measured present in the external space 2. On the other hand, in a region (first region) for introducing light (infrared ray IR in this embodiment) and a region (first region) for extracting light, the core layer 11 has the first portions 11a formed so as to have a film thickness larger than that of the second portion 11b in the second region. In the surfaces of the first portions 11a, grooves for forming the gratings (grating couplers 118 and 119) are dug. The film thickness of the second portion 11b is about 250 nm, for example. The film thickness of the first portions 11a is about 750 nm, for example. The groove depth of the grating couplers 118 and 119 is about 400 nm, for example.

The core layer 11 has the third portions 11c in the third regions which are regions between the first regions and the second region. The third portions 11c are configured to exhibit a function as a connection portion connecting the first portions 11a and the second portion 11b. In the third portions 11c, the film thickness may increase with a gentle inclination from the second region where the second portion 11b is provided toward the first regions where the first portions 11a are provided. In the surface of the core layer 11, the roughness may be as small as possible also including a region having a film thickness inclination except the portions where the grooves of the grating couplers 118 and 119 are formed. In the case where the surface of the core layer 11 has a sharp film thickness change, the amount of light leaking to the outside from the core layer 11 increases when the light propagates from a large film thickness region toward a small film thickness region.

Figure 2:
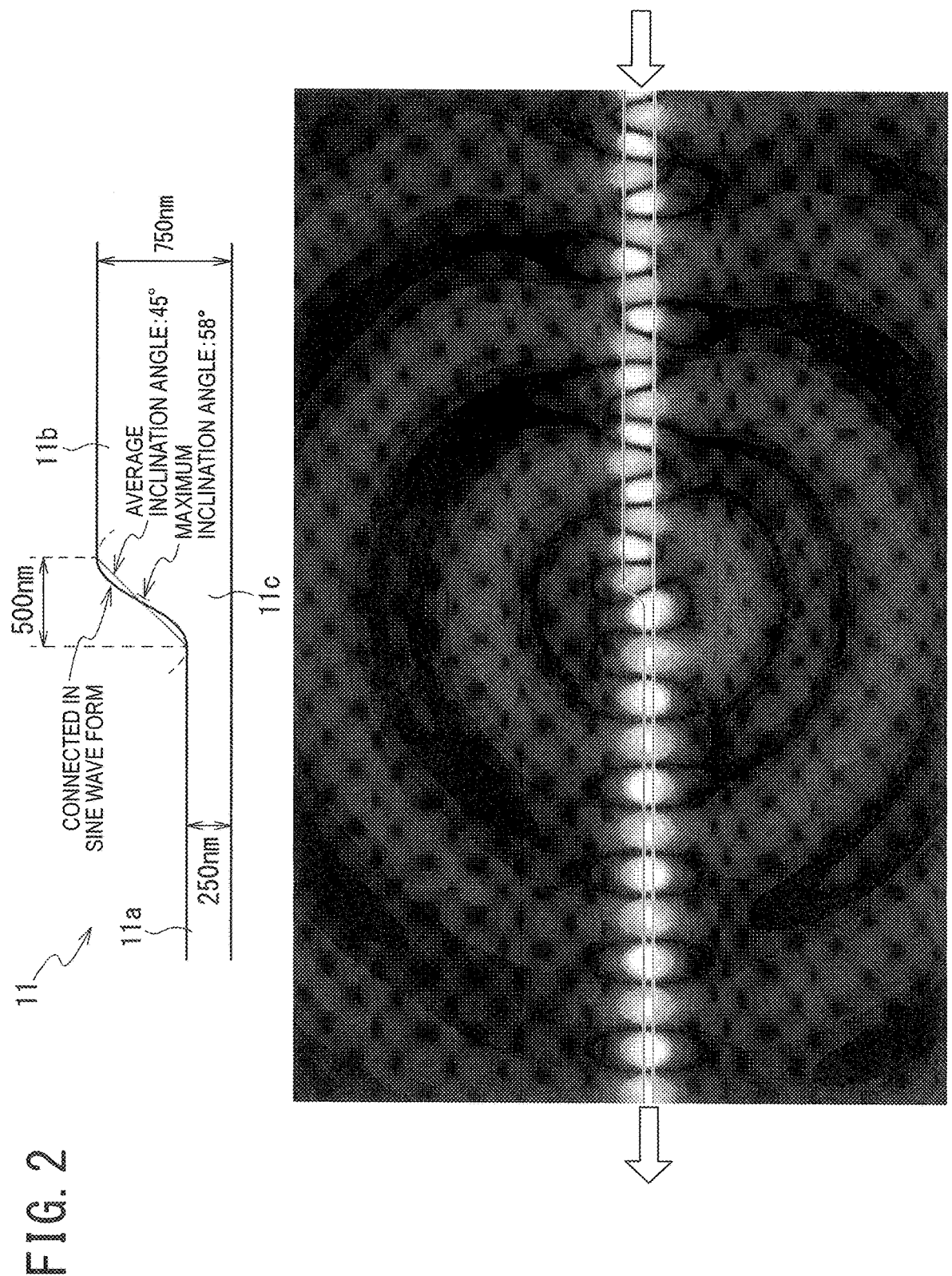
FIG. 2 is a figure explaining the optical waveguide 10 according to one embodiment of the present invention and illustrates a simulation result (No. 1) indicating the leakage of light to the outside of a core layer 11 in a connection portion of the core layer 11 having different film thickness regions.

Herein, the light leaking to the outside from the core layer in the portion where the film thickness changes is described with reference to FIGS. 2 and 3. FIGS. 2 and 3 illustrate simulation results when an infrared ray having a wavelength of 4.26 μm is propagated from the core layer having a film thickness of 750 nm into the core layer having a film thickness of 250 nm. The upper figure of FIG. 2 and the upper figure of FIG. 3 illustrate the schematic shape of the core layer used for the simulation. The lower figure of FIG. 2 and the lower figure of FIG. 3 illustrate a state of the infrared ray propagating through the core layer. The figures illustrated in the lower figure of FIG. 2 and the lower figure of FIG. 3 illustrate a state where the infrared ray is propagated through the core layer from the right toward the left. FIG. 2 is a figure illustrating a result when the horizontal distance of the connection portion having the film thickness inclination (third portion 11c) is set to 500 nm and the connection portion connects the second portion 11b having a film thickness of 250 nm and the first portion 11a having a film thickness of 750 nm in a sine wave form. The maximum inclination angle of the third portion 11c is about 58° and the average inclination angle is 45°. FIG. 3 is a figure illustrating a result when the horizontal distance of the connection portion (third portion 11c) is set to 2000 nm and the connection portion connects the second portion 11b having a film thickness of 250 nm and the first portion 11a having a film thickness of 750 nm in a sine wave form. The maximum inclination angle of the third portion 11c is 21° and the average inclination angle thereof is 14°.

A comparison between FIGS. 2 and 3 shows that the amount of the light leaking to the outside of the core layer is larger in the state illustrated in FIG. 2 in which a sharp film thickness change occurs in the third portion 11c, so that the inclination angle is large.

Figure 4:
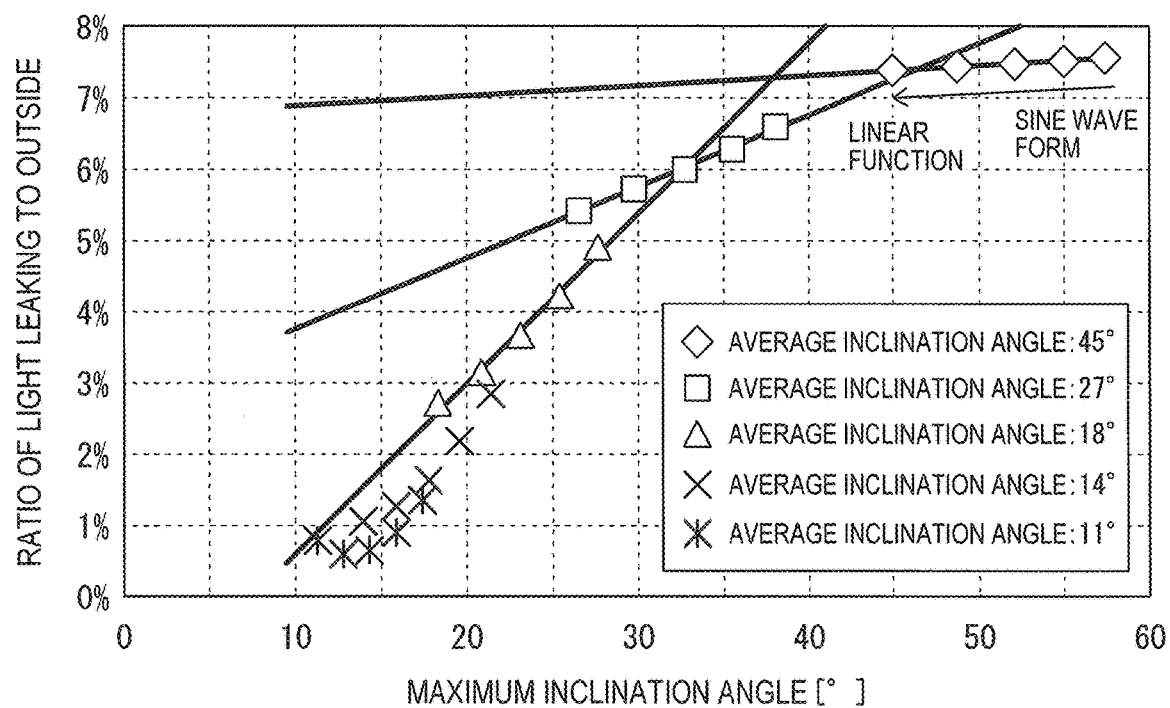
FIG. 4 is a figure explaining the optical waveguide 10 according to one embodiment of the present invention and illustrates simulation results indicating the relationship between the inclination angle of the connection portion and the leakage amount of light to the outside of the core layer 11 in the connection portion of the core layer 11 having the different film thickness regions.

Next, FIG. 4 illustrates simulation results of gradually changing the shape of the connection portion (third portion 11c) from the sine wave form to the linear function form to thereby change the maximum inclination angle and the average inclination angle, and then investigating the ratio of the light leaking to the outside of the core layer (which is sometimes referred to as "leakage light ratio" in the description of FIG. 4) at various inclination angles. The horizontal axis represents the maximum inclination angle (°) of the connection portion. The vertical axis represents the leakage light ratio (%). The ◇ marks illustrated in FIG. 4 indicate the leakage light ratio when the average inclination angle of the connection portion is 45°. The □ marks illustrated in FIG. 4 indicate the leakage light ratio when the average inclination angle of the connection portion is 27°. The △ marks illustrated in FIG. 4 indicate the leakage light ratio when the average inclination angle of the connection portion is 18°. The x marks illustrated in FIG. 4 indicate the leakage light ratio when the average inclination angle of the connection portion is 14°. The * marks illustrated in FIG. 4 indicate the leakage light ratio when the average inclination angle of the connection portion is 11°. At each of the average inclination angles, five leakage light ratio results are illustrated. In FIG. 4, with respect to the leakage light ratio results at the same average inclination angle, the leakage light ratio results on the right side among the five leakage light ratios are close to the sine wave form and the leakage light ratio results on the left side among the five leakage light ratios is close to the linear function form. The rightmost side is equal to the sine wave form and the leftmost side is equal to the linear function form.

As is understood from FIG. 4, the ratio of the light leaking to the outside of the core layer almost depends on the maximum inclination angle of the connection portion between different film thicknesses and decreases from a region where the maximum inclination angle reaches 45° or less. By reducing the maximum inclination angle to 10°, the amount of the light leaking to the outside is 1% or less, so that influence of the leakage in the film thickness inclination portion can be almost eliminated. When the inclination of the connection portion is excessively made gentle, a large space (length) required for giving a film thickness difference between the first portion 11a and the second portion 11b is needed, and therefore, on the contrary, a state where the maximum inclination angle is less than 10° is not preferable.

Moreover, the average inclination angle also exerts influence. In a region where the maximum inclination angle is 45° or less, the ratio of the light leaking to the outside of the core layer is lower when the average inclination angle comparing the points at almost the same maximum inclination angles is smaller. This effect is observed when the average inclination angle is 30° or less.

Figure 5:
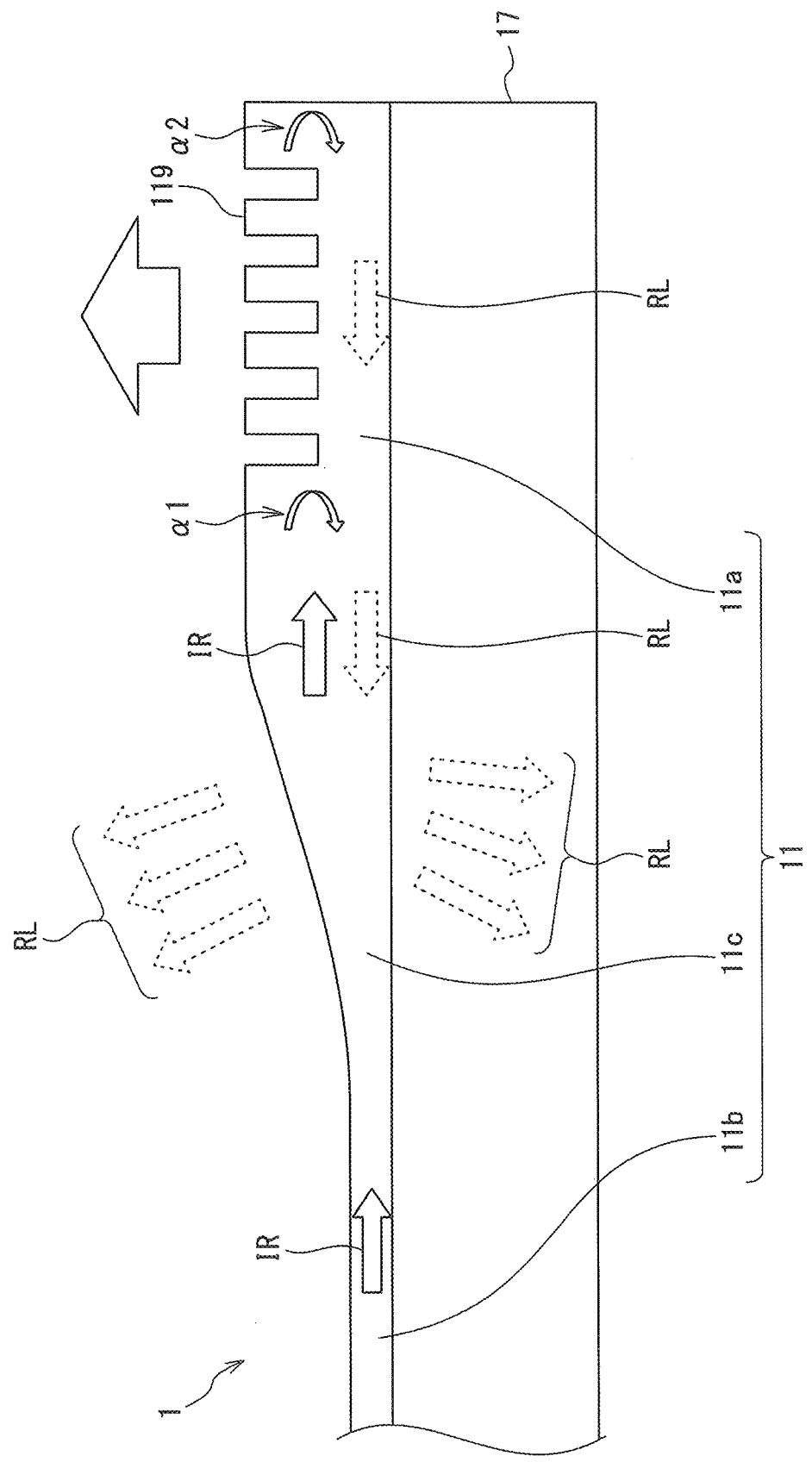
FIG. 5 is a figure explaining the optical waveguide 10 according to one embodiment of the present invention and is a figure illustrating an example when light is introduced into a first portion 11a (thick film side) of the core layer 11 from a second portion 11b (thin film side) of the core layer 11 in the connection portion of the core layer 11 having the different film thickness regions.
Figure 6:
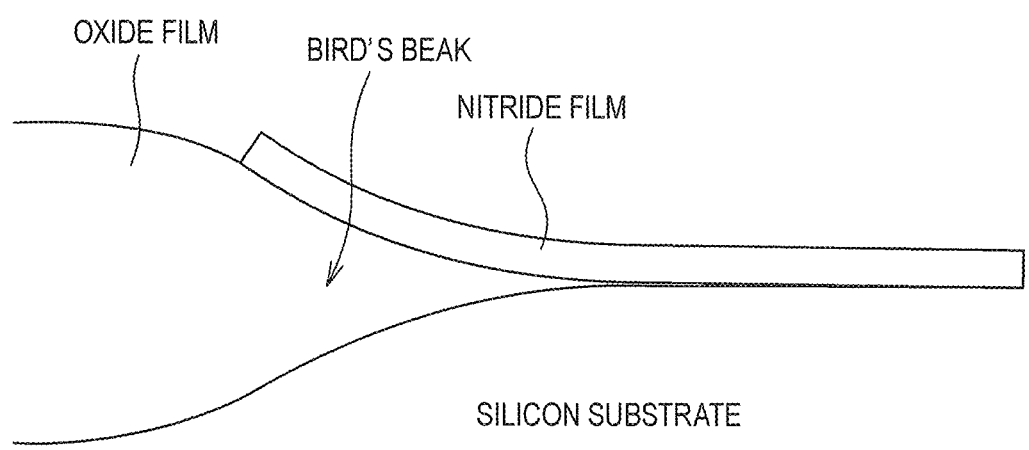
FIG. 6 is a figure for explaining a bird's beak.

Next, the system where light is propagated from a small film thickness region into a large film thickness region of the core layer and a grating coupler is provided ahead or the system where the core layer is terminated is considered. As illustrated in FIG. 5, since light (infrared ray IR) is scattered in various directions, a reflected light RL propagates in the opposite direction is certainly present in a region α1, for example, in the grating coupler 119. The reflected light RL also certainly generates in a termination portion (region α2) of the core layer 11. The reflected lights RL propagate from a large film thickness region (first portion 11a) toward a small film thickness region (second portion 11b) of the core layer 11 at this time, and therefore, when the maximum inclination angle is steep, the amount of light leaking to the outside increases similarly to the case of propagating the infrared ray IR from the first portion 11a into the second portion 11b. Therefore, in the region where the core layers 11 different in film thickness are connected, the maximum inclination angle may be set to 10° or more and 45° or less and the average inclination angle may be set to 30° or less.

On the other hand, the roughness of the surface of the core layer 11 is also very important. This is because, when the surface of the core layer 11 has a high roughness region, the infrared ray IR propagating through the core layer 11 is irregularly reflected to leak outside the core layer 11. Although details are described later, a so-called bird's beak formed in thermal oxidation illustrated in FIG. 6 or the migration of atoms in a hydrogen atmosphere illustrated in FIGS. 12A and 12B described later is utilized for the formation of the third portion 11c in this embodiment. Therefore, a surface with low surface roughness can be achieved while giving a very gentle inclination in the third portion 11c. The maximum angle of the third portion 11c may be 10° or more and 45° or less and may be 10° or more and 30° or less. The average inclination angle of the third portion 11c may be 30° or less. The core layer 11 may be a single crystal with few crystal defects. Due to the fact that the core layer 11 is a single crystal with few crystal defects, the scattering of the propagating light inside the core layer 11 is suppressed and a propagation loss of the core layer 11 can be reduced.

As described above, by giving the inclination in which the maximum inclination angle is 10° or more and 45° or less to the surface of the core layer 11 and forming the first portion 11a to have a film thickness larger than that of the second portion 11b, the light unexpectedly leaking to the outside of the core layer 11 can be suppressed, so that the performance of the sensor by the ATR method can be improved.

An optical concentration measuring device provided with a conventional optical waveguide using the ATR method has a configuration of introducing an infrared ray into a core layer of the optical waveguide from one grating coupler, propagating the infrared ray through the core layer, extracting the infrared ray from the other grating coupler side, and then detecting the amount of the infrared ray with a photodetector provided ahead as with the optical concentration measuring device 1 according to this embodiment. In the sensor using the ATR method, the wavelength of a mid-infrared region is handled in many cases. For an infrared ray of a mid-infrared region, the optimal core layer film thicknesses is greatly different between a core layer for exuding an evanescent wave and a core layer for extracting light by a grating.

Specifically, in the case of an optical waveguide using silicon as a core layer, for example, the core layer is thinly formed so that the film thickness is about 200 nm in order to efficiently exude an evanescent wave. On the other hand, the film thickness of 200 nm is excessively thin as the film thickness of the grating for efficiently extracting the infrared ray of the mid-infrared region. For example, when the refractive index of the silicon core layer is set to 3.4 and the wavelength of the infrared ray to be propagated through the core layer is 4 μm, the optimal film thickness of the core layer in a region where the grating is formed is about 590 nm when the grating is designed according to the method described in NPL 1. The film thickness of 590 nm is greatly different from the core layer film thickness for efficiently exuding an evanescent wave. More specifically, when the grating is formed as it is in the thin-film core layer for exuding an evanescent wave, the light extraction efficiency deteriorates.

For example, when the wavelength of the infrared ray to be propagated is set to 4 μm and the groove depth of the grating is designed according to the method described in PTL 2, a groove depth of about 390 nm is an optimal value. This value is larger than 200 nm which is the core layer film thickness for efficiently exuding an evanescent wave as described above. Therefore, a grating having a groove depth in which the light extraction efficiency is optimal cannot be formed in the thin-film core layer for exuding an evanescent wave under the above-described conditions.

The above-described two examples have a problem that a grating in which the light extraction efficiency is optimal cannot be formed in the thin-film core layer for exuding an evanescent wave. On the other hand, a core layer which allows the formation of a grating in which the light extraction efficiency is optimal has a problem that an evanescent wave cannot be efficiently exuded. Thus, the conventional optical waveguide has a problem that the evanescent wave exuding efficiency and the light extraction efficiency of the grating are in a trade-off relationship, so that it is difficult to achieve both the evanescent wave exuding efficiency and the light extraction efficiency of the grating.

In contrast thereto, the optical waveguide 10 according to this embodiment is provided with the core layer 11 having the second portion 11b having a film thickness suitable for the propagation of the infrared ray IR, the first portion 11a having a film thickness which allows the formation of the grating coupler 119 having a groove depth suitable for the extraction of the infrared ray IR, and the third portions 11c adjusted so that light can be propagated between the first portion 11a and the second portion 11b with a low loss. Thus, the optical waveguide 10 solves the above-described problems of the conventional optical waveguide and can achieve an improvement of the evanescent wave exuding efficiency of propagating light and the light extraction efficiency.

<First Method for Manufacturing Optical Waveguide and Optical Concentration Measuring Device>

Figure 7:
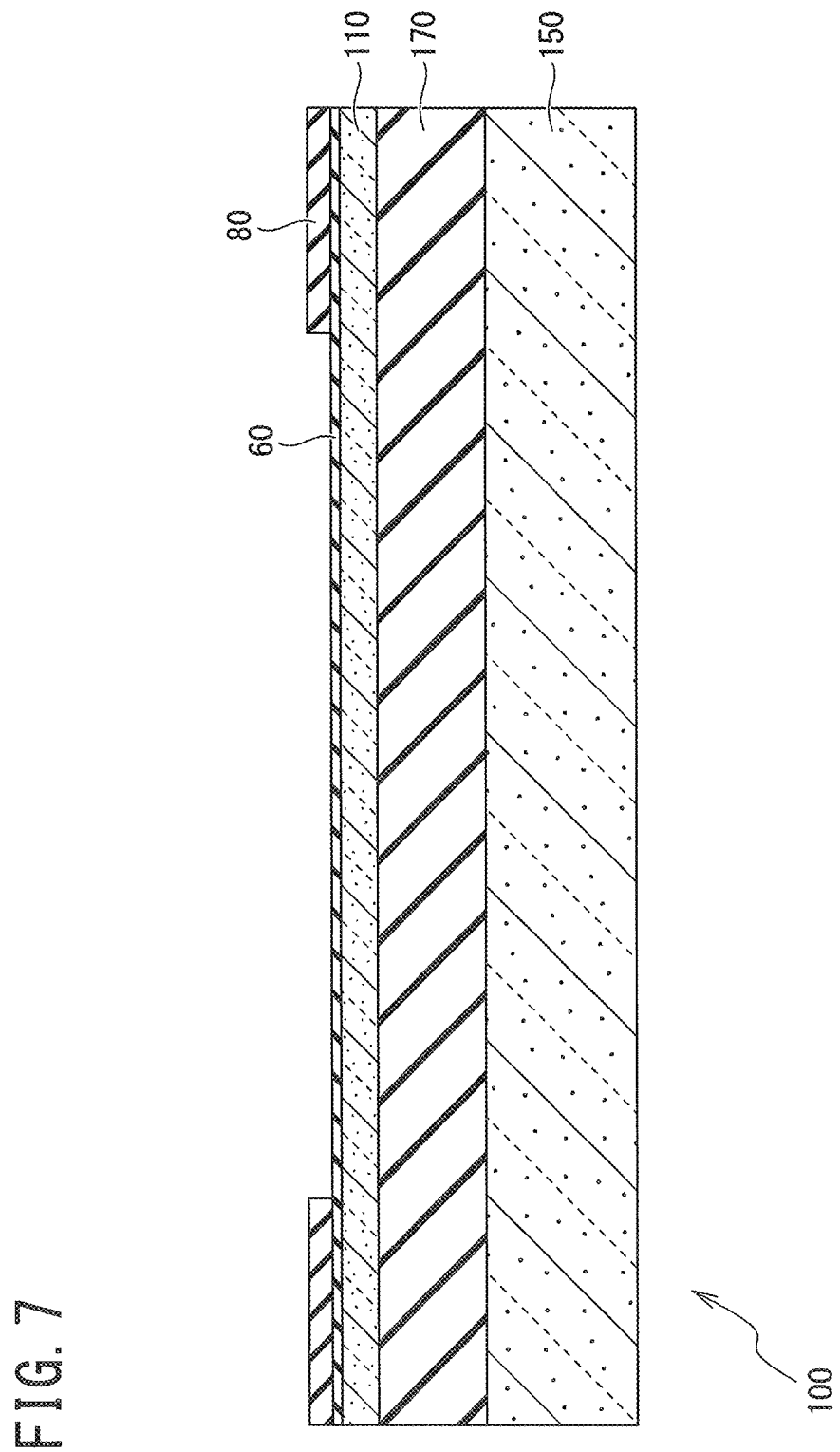
FIG. 7 is a figure (No. 1) for explaining a first method for manufacturing the optical waveguide 10 according to one embodiment of the present invention.
Figure 8:
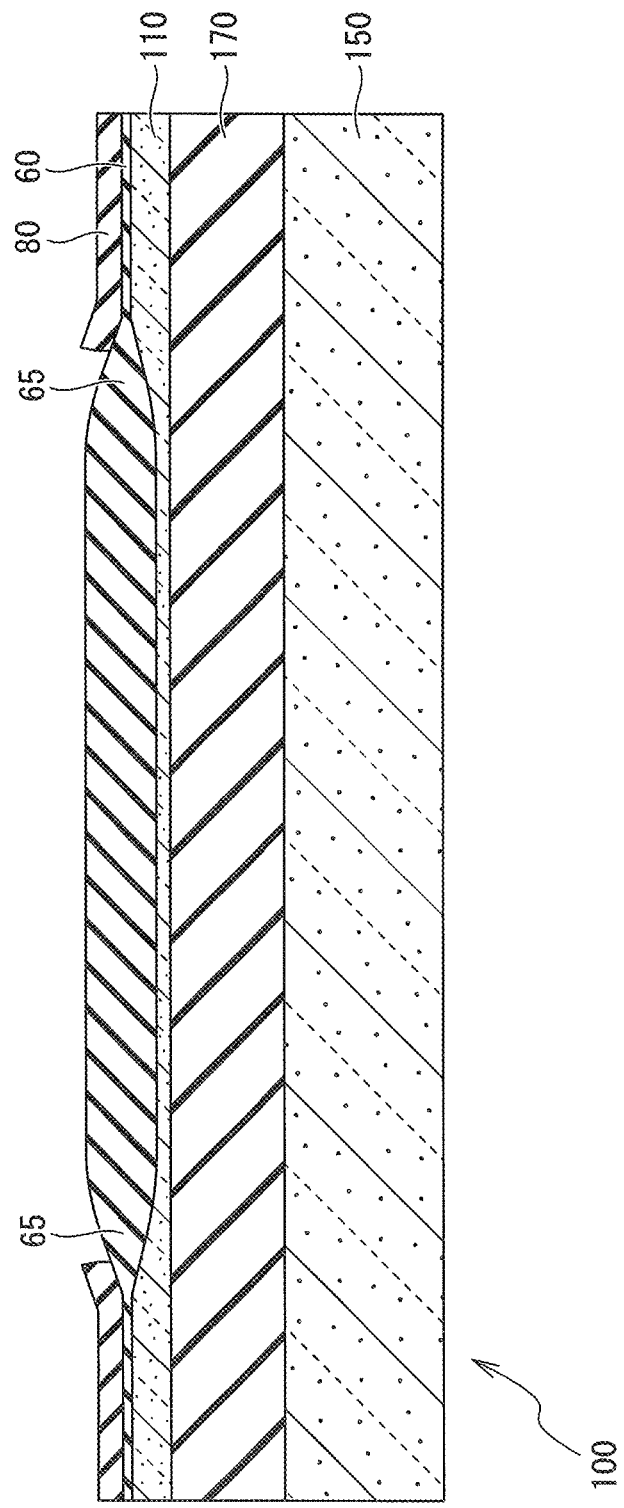
FIG. 8 is a figure (No. 2) for explaining the first method for manufacturing the optical waveguide 10 according to one embodiment of the present invention.
Figure 9:
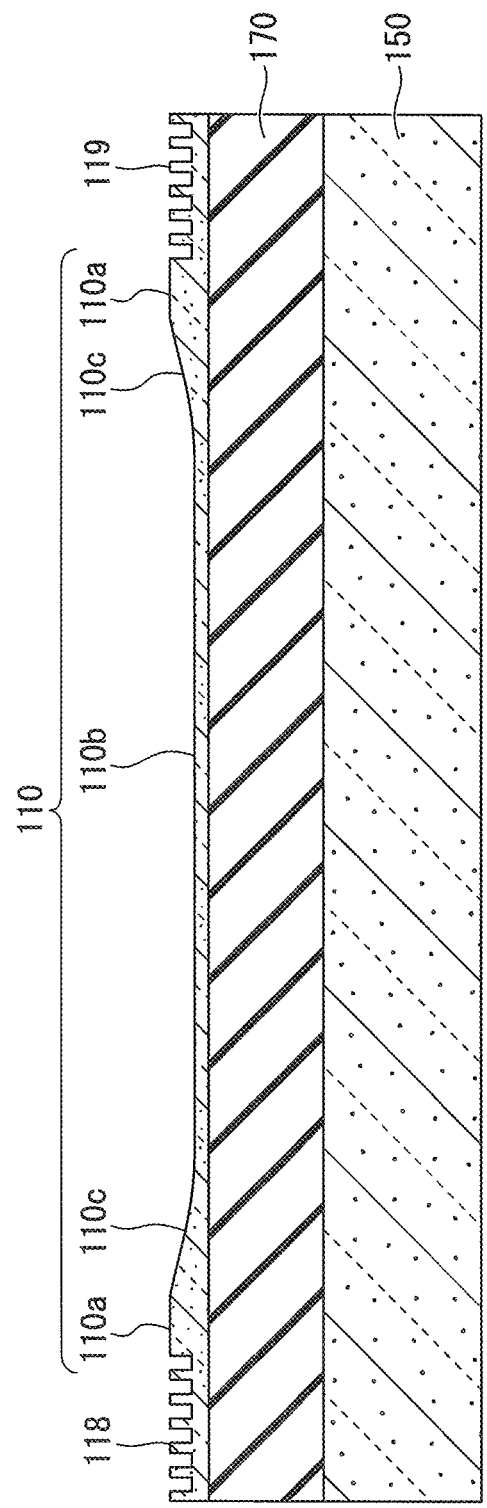
FIG. 9 is a figure (No. 3) for explaining the first method for manufacturing the optical waveguide 10 according to one embodiment of the present invention.

Next, a first method for manufacturing an optical waveguide and an optical concentration measuring device according to this embodiment is described using FIGS. 7 to 9 referring to FIG. 1. FIGS. 7 to 9 illustrate manufacturing process cross-sectional views of the optical waveguide 10. The optical waveguide 10 is manufactured by being singulated after simultaneously forming a plurality of optical waveguide principal portions in one support substrate 150. FIGS. 7 to 9 illustrate manufacturing processes of only one optical waveguide among the plurality of optical waveguides to be formed.

First, an SiO$_2$ film is formed on either one or both of the support substrate 150 made of silicon and finally serving as the substrate 15 and an active substrate 110 which is made of silicon and on which the core layer 11 is formed, and then the support substrate 150 and the active substrate 110 are bonded to each other in such a manner as to hold the SiO$_2$ film therebetween and heat-treated for joining. Thereafter, the film thickness of the active substrate 110 is adjusted by grinding and polishing the active substrate 110 to a predetermined thickness. Thus, as illustrated in FIG. 7, the SOI substrate 100 is formed which has the support substrate 150, a BOX layer 170 formed on the support substrate 150, and the active substrate 110 formed on the BOX layer 170 and which has a "Silicon-Insulating layer-Silicon" structure.

Next, an oxide film 60 is formed on the surface of the SOI substrate 100, and a silicon nitride film is formed on the surface of the oxide film 60. Next, the silicon nitride film formed on the oxide film 60 is subjected to a lithography technology, an etching technology, and an ashing technology to form a hard mask 80 as illustrated in FIG. 7. A region where the hard mask 80 is formed is equivalent to parts of the first region and the third region (see FIG. 1) where parts of the first portion 11a and the third portion 11c, respectively, are finally formed of the core layer 11. A region where the hard mask 80 is opened, so that the oxide film 60 is exposed is equivalent to parts of the second region and the third region (see FIG. 1) where parts of the second portion 11b and the third portion 11c, respectively, are finally formed of the core layer 11.

Next, as illustrated in FIG. 8, thermal oxidation of the SOI substrate 100 in which the hard mask 80 is formed is carried out under an oxygen atmosphere containing vapor of 800° C. or more, for example. At this time, bird's beaks 65 are formed in the third regions which are equivalent to the connection portions of the first regions where the first portions 11a are finally formed and the second region where the second portion 11b is finally formed and in which the third portions 11c are finally formed (see FIG. 1). The shape of the bird's beak 65 can be controlled to some extent by the film thickness of the silicon nitride film to be used as the hard mask 80. When the film thickness of the silicon nitride film is reduced, the inclination angle of the bottom surface of the bird's beak 65 can be made gentle.

Next, the hard mask 80 is removed by hot phosphoric acid. Thereafter, the oxide film 60 is removed using fluoric acid or the like. Thus, as illustrated in FIG. 9, on the surface of a TOP silicon layer of the SOI substrate 100, i.e., the surface of the active substrate 110, first flat surfaces 110a provided in regions where the first portions 11a are finally formed, a second flat surface 110b provided in a region where the second portion 11b is finally formed, and inclined surfaces 110c provided in regions where the third portions 11c are finally formed and gently inclined between the first flat surfaces 110a and the second flat surface 110b are formed.

Thereafter, lithography, etching, and ashing are performed using a mask (not illustrated) in which only regions to serve as recessed portions of the grating couplers 118 and 119 are opened to form grooves of the grating couplers 118 and 119 in the first flat surfaces 110a of the TOP silicon layer of the SOI substrate 100.

Next, the active substrate 110 is subjected to lithography, etching, and ashing, so that the individualized core layers 11 are formed on the BOX layer 170.

Next, the support substrate 150 is cut in predetermined regions to singulate the SOI substrate 100. Thus, the optical waveguide 10 (see FIG. 1) is completed.

Furthermore, the light source 20 is installed so that an infrared ray can be made incident on the grating coupler 118 of the optical waveguide 10 and the photodetector 40 is disposed so as to be able to receive an infrared ray emitted from the grating coupler 119 of the optical waveguide 10 as illustrated in FIG. 1, whereby the optical concentration measuring device 1 is completed.

An order of manufacturing processes of previously forming a pattern of the core layer 11, and then forming the grooves of the grating couplers 118 and 119 may be acceptable. When a core layer of a so-called pedestal structure in which a part of the SOI substrate 100 is floated is formed, a process of etching the BOX layer 170 of the SOI substrate 100 may be added after forming the core layer 11. Furthermore, a protective film may be formed on the surface of the core layer 11. The protective film may be a film containing nitrogen and the film thickness may be 1 nm or more and less than 20 nm. By forming the protective film on the surface of the core layer 11, degradation of the surface of the core layer 11 by natural oxidation or the like can be prevented while maintaining the measurement sensitivity of the optical waveguide 10. As a result, the optical waveguide 10 and the optical concentration measuring device 1 in which aged deterioration is prevented can be manufactured.

<Second Method for Manufacturing Optical Waveguide and Optical Concentration Measuring Device>

Figure 10:
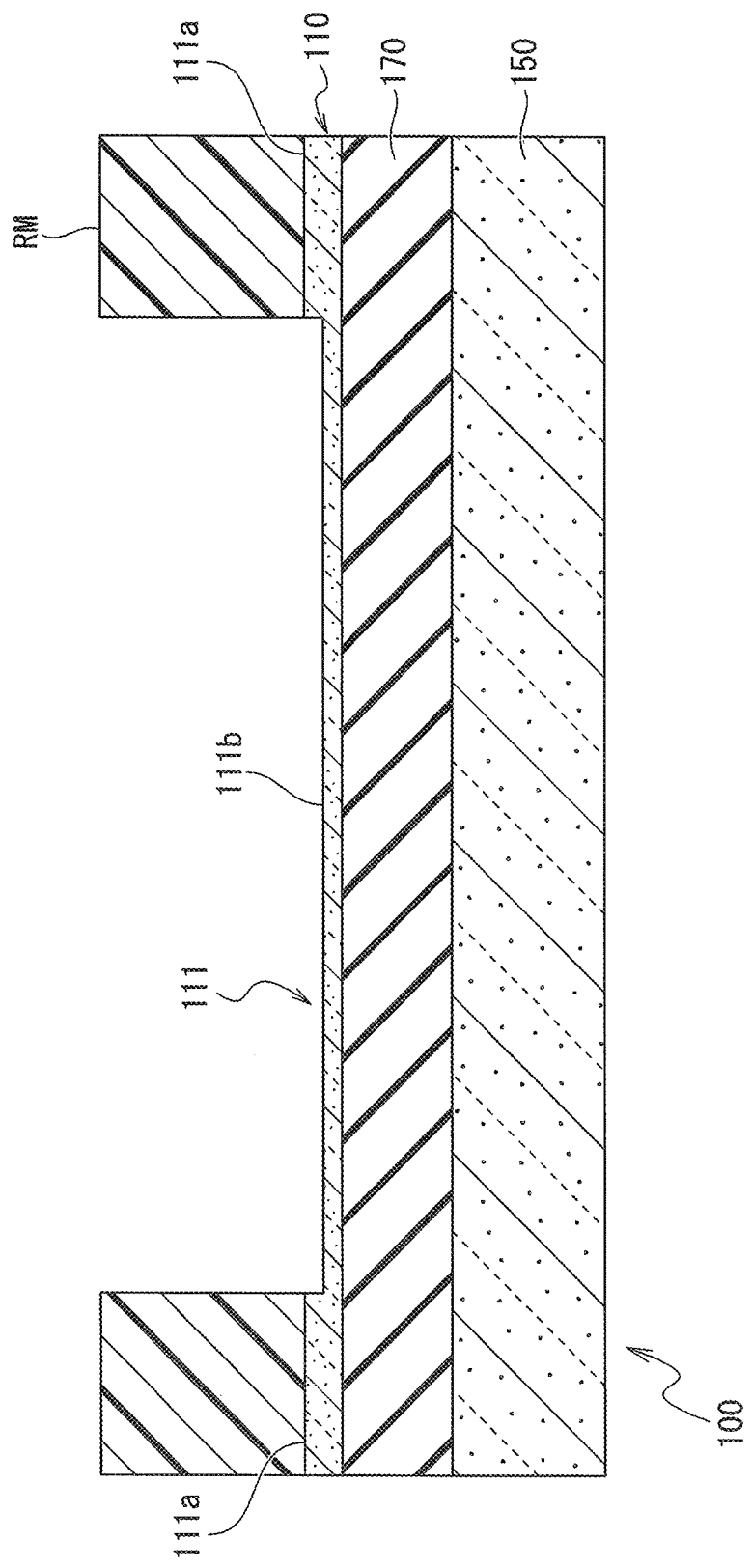
FIG. 10 is a figure (No. 1) for explaining a second method for manufacturing the optical waveguide 10 according to one embodiment of the present invention.
Figure 11:
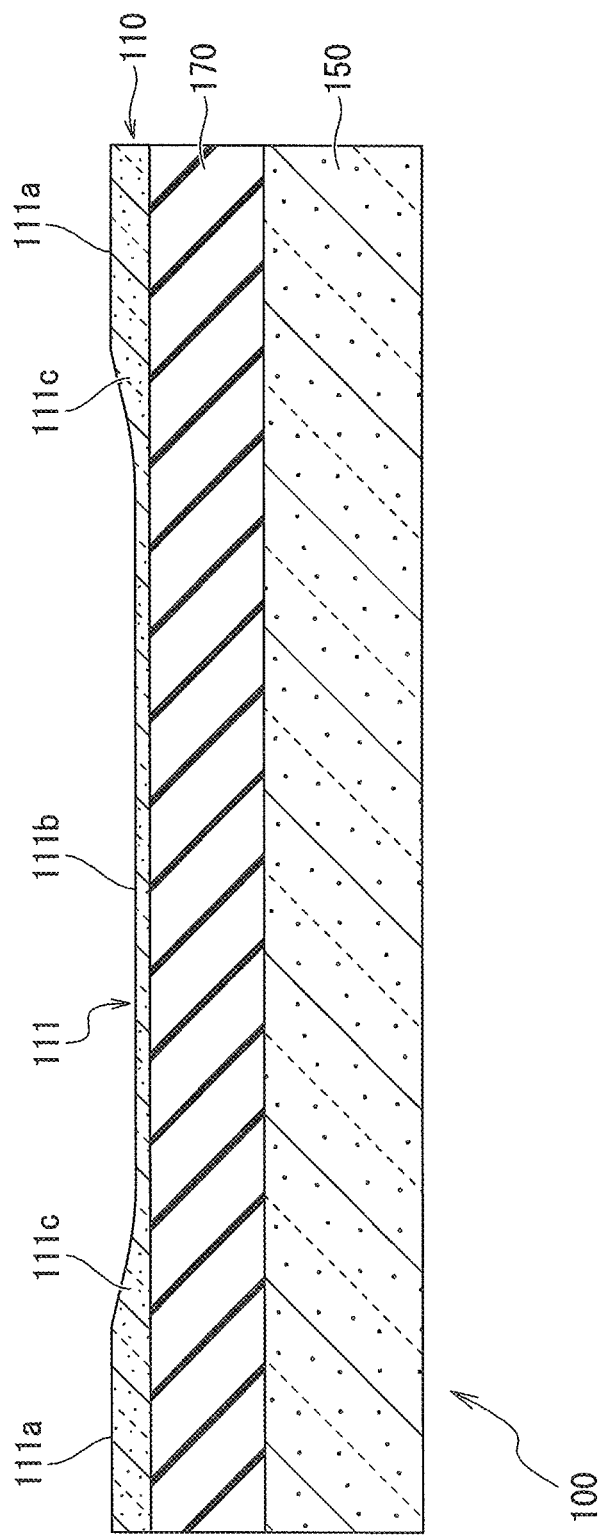
FIG. 11 is a figure (No. 2) for explaining the second method for manufacturing the optical waveguide 10 according to one embodiment of the present invention.
Figure 12A:
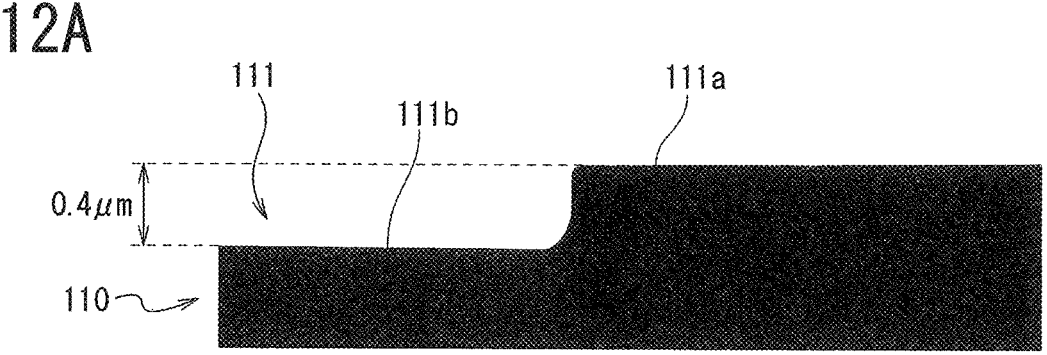
FIGS. 12A and 12B are figures (No. 3) for explaining the second method for manufacturing the optical waveguide 10 according to one embodiment of the present invention.
Figure 12B:
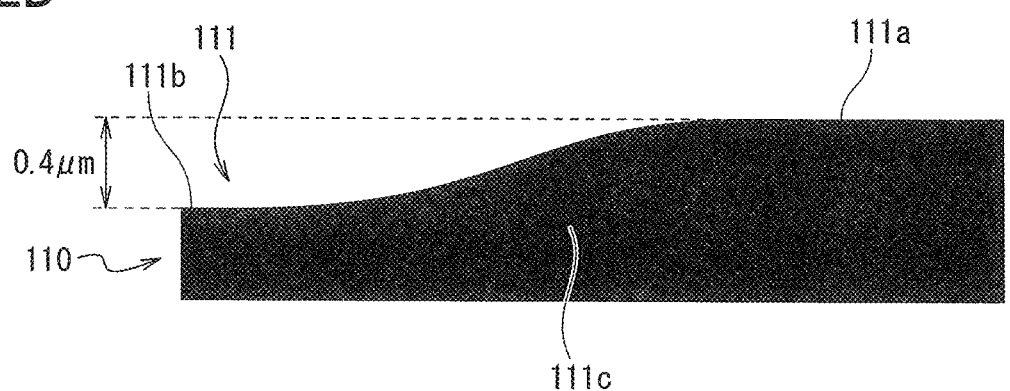
Figure 13:
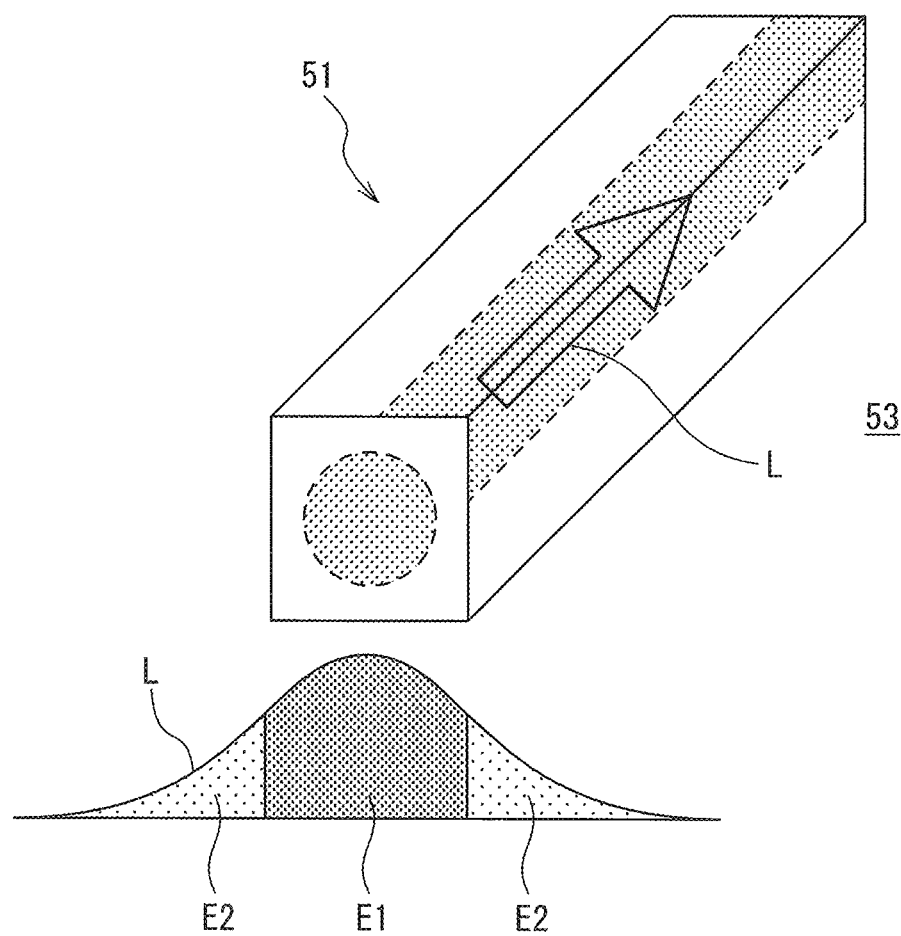
FIG. 13 is a figure for explaining an evanescent wave of light propagating through an optical waveguide.

Next, a second method for manufacturing an optical waveguide and an optical concentration measuring device according to this embodiment is described using FIGS. 10 to 12 referring to FIGS. 1 and 9. A description common to the description of the first method for manufacturing an optical waveguide and an optical concentration measuring device described above is omitted. FIGS. 10 and 11 illustrate manufacturing process cross-sectional views of the optical waveguide in the second method for manufacturing the optical waveguide and the optical concentration measuring device according to this embodiment. Also in the second manufacturing method, the optical waveguide is manufactured by being singulated after simultaneously forming a plurality of optical waveguide principal portions in one support substrate. FIGS. 10 and 11 illustrate manufacturing processes of only one optical waveguide among the plurality of optical waveguides to be formed. FIGS. 12A and 12B are cross-sectional SEM images illustrating changes of the cross-sectional shape of the optical waveguide principal portion in the manufacturing process and illustrating the vicinity of the boundary between a bottom portion and a top portion of a groove formed in an active substrate. In FIGS. 12A and 12B, in order to facilitate the understanding, the illustration of an image of the background of the upper side of the active substrate projected in the SEM images is omitted.

In a region where the core layer 11 is finally formed of the active substrate 110 provided in the SOI substrate 100 formed by the same method as the first manufacturing method, a groove 111 is selectively formed in the active substrate 110 with a resist mask RM formed by photoresist as a mask using a lithography technology and an etching technology as illustrated in FIG. 10. Top portions 111a of the groove 111 are equivalent to parts of the first regions and the third regions (see FIG. 1) in which parts of the first portions 11a and the third portion 11c, respectively, are finally formed of the core layer 11. A bottom portion 111b of the groove 111 is equivalent to parts of the second region and the third regions (see FIG. 1) where parts of the second portion 11b and the third portions 11c, respectively, are finally formed of the core layer 11.

Next, the resist mask RM is removed by an ashing technology, and then heat treatment in a hydrogen atmosphere is carried out to migrate silicon atoms to form inclined structures 111c in which the film thickness of a region where the core layer 11 is finally formed of the active substrate 110 is gradually increased from the bottom portion 111b of the groove 111 toward the top portions 111a of the groove 111 as illustrated in FIG. 11. More specifically, gentle inclinations are formed in the third regions (see FIG. 1) which are equivalent to the connection portions of the first regions where the first portions 11a are finally formed and the second region where the second portion 11b is finally formed and in which the third portions 11c are finally formed. The inclined structures 111c have a shape of gently inclining between the bottom portion 111b of the groove portion 111 and the top portions 111a of the groove portion 111.

The heat treatment in the hydrogen atmosphere is carried out at a high temperature of 1100° C., for example. As illustrated in FIG. 12A, before the heat treatment in the hydrogen atmosphere is carried out, the groove 111 has a step-like shape in which the film thickness of the active substrate 110 made of silicon (Si) sharply increases from the bottom portion 111b toward the top portion 111a. On the other hand, as illustrated in FIG. 12B, after the heat treatment in the hydrogen atmosphere is carried out, the groove 111 has the inclined structure 111c in which the film thickness of the active substrate 110 gradually increases from the bottom portion 111b toward the top portion 111a. Thus, it is found that a very gentle inclination can be formed between the bottom portion 111b and the top portion 111a of the groove 111.

The inclination formation technology utilizing the bird's beak described in the first manufacturing method (hereinafter sometimes referred to as "first inclination formation technology") and the inclination formation technology by the heat treatment in the hydrogen atmosphere described in the second manufacturing method (hereinafter sometimes referred to as "second inclination formation technology") may be properly used according to the height of the inclination to be formed in the active substrate 110. In the first inclination formation technology, the inclination height in the active substrate 110 originates from the thickness of the oxide film to be formed by the thermal oxidation method. Therefore, the first inclination formation technology is very excellent in obtaining the uniformity of the inclination height. On the other hand, the first inclination formation technology becomes more difficult with an increase in the inclination height. For example, in order to obtain an inclination height of 1 μm in the active substrate 110, an oxide film having a film thickness of at least 2 μm or more needs to be formed on the active substrate 110 by thermal oxidation. Therefore, in order to form the oxide film on the active substrate 110, the oxidation over a very long period of time needs to be carried out. On the other hand, in the second inclination formation technology, the inclination height in the active substrate 110 can be controlled by the depth of the groove 111 before the heat treatment in the hydrogen atmosphere. Therefore, the second inclination formation technology is suitable for obtaining an inclination with a high height in the active substrate 110 as compared with the first inclination formation technology. For example, when the inclined structure 111c having an inclination height of 1 μm is formed in the active substrate 110, etching for forming the groove 111 having a depth of 1 μm may be carried out, and then heat treatment in a hydrogen atmosphere for about 10 minutes may be carried out. In addition, in the second inclination formation technology, the inclination angle is more easily controlled as compared with the first inclination formation technology. When a gentler inclination needs to be formed in the active substrate 110, the heat treatment time may be prolonged. However, the uniformity of the inclination height is better in the first inclination formation technology than in the second inclination formation technology due to a variation in the etching rate in the process of digging the groove 111. Therefore, it is preferable to properly use the technologies of forming the inclined structure 111c in the active substrate 110 according to the intended use of the optical waveguide and the optical concentration measuring device.

Thus, in the surface of the TOP silicon layer of the SOI substrate 100, i.e., the surface of the active substrate 110, the first flat surfaces 110a provided in the regions where the first portions 11a are finally formed, the second flat surface 110b provided in the region where the second portion 11b is finally formed, and the inclined surfaces 110c provided in the regions where the third portions 11c are finally formed and gently inclined between the first flat surfaces 110a and the second flat surface 110b are formed. The inclined surface 110c is the surface of the inclined structure 111c.

Thereafter, lithography, etching, and ashing are performed using a mask (not illustrated) in which only regions to serve as recessed portions of the grating couplers 118 and 119 (see FIG. 1) are opened to form grooves of the grating couplers 118 and 119 in the first flat surfaces 110a of the TOP silicon layer of the SOI substrate 100 as illustrated in FIG. 9.

Then, the optical concentration measuring device 1 is completed by the same manufacturing method as the contents described in the first manufacturing method. Also in the second manufacturing method, an order of manufacturing processes of previously forming a pattern of the core layer 11, and then forming the grooves of the grating couplers 118 and 119 may be acceptable. When forming a core layer of a so-called pedestal structure in which a part of the SOI substrate 100 is floated, a process of etching the BOX layer 170 of the SOI substrate 100 may be added after forming the core layer. Furthermore, a protective film may be formed on the surface of the core layer 11. The protective film may be a film containing nitrogen and the film thickness may be 1 nm or more and less than 20 nm. By forming the protective film on the surface of the core layer 11, degradation of the surface of the core layer 11 by natural oxidation or the like can be prevented while maintaining the measurement sensitivity of the optical waveguide 10. As a result, the optical waveguide 10 and the optical concentration measuring device 1 in which aged deterioration is prevented can be manufactured.

As described above, according to the method for manufacturing an optical waveguide and the method for manufacturing an optical concentration measuring device of this embodiment, the film thickness of the light propagation portion of the core layer and the film thickness of the region where the grating coupler 119 is provided can be optimized without using a special manufacturing technology. Thus, according to the method for manufacturing an optical waveguide and the method for manufacturing an optical concentration measuring device of this embodiment, an optical waveguide and an optical concentration measuring device capable of achieving an improvement of the evanescent wave exuding efficiency of propagating light and the light extraction efficiency can be manufactured.

REFERENCE SIGNS LIST

1 optical concentration measuring device
2 external space
10 optical waveguide
11, 51 core layer
11*a* first portion
11*b* second portion
11*c* third portion
15 substrate
17 support portion
20 light source
40 photodetector
60 oxide film
65 bird's beak
80 hard mask
100 SOI substrate
110 active substrate
110*a* first flat surface
110*b* second flat surface
110*c* inclined surface
111 groove
111*a* top portion
111*b* bottom portion
111*c* inclined structure
118, 119 grating coupler
150 support substrate
EW evanescent wave
IR infrared ray
RL reflected light
RM resist mask
α1, α2 region

The invention claimed is:

1. An optical waveguide comprising:
a core layer capable of propagating light and having a first portion having a first film thickness, a second portion having a second film thickness different from the first film thickness, and a third portion connecting between the first portion and the second portion,
wherein the first portion has a grating portion,
the second portion has a light propagation portion,
in the third portion, a film thickness is gradually increased from a small film thickness side toward a large film thickness side between the first portion and the second portion,
the grating portion has a recessed portion, and
a depth of the recessed portion or a film thickness of the recessed portion is larger than a film thickness of the light propagation portion.

2. The optical waveguide according to claim 1, wherein a maximum inclination angle of a gradually increased film thickness inclination is 10° or more and 45° or less in the third portion.

3. The optical waveguide according to claim 1, wherein an average inclination angle of a gradually increased film thickness inclination is 30° or less in the third portion.

4. The optical waveguide according to claim 1, wherein the core layer is made of a single crystal.

5. The optical waveguide according to claim 1 further comprising:
a protective film formed on at least a part of a surface of the core layer, having a film thickness of 1 nm or more and less than 20 nm, and having a refractive index smaller than a refractive index of the core layer.

6. The optical waveguide according to claim 5, wherein the protective film is a silicon nitride film or a silicon oxynitride film.

7. The optical waveguide according to claim 1, wherein light propagating through the core layer is an infrared ray as an analog signal.

8. An optical concentration measuring device comprising:
the optical waveguide according to claim 1;
a light source capable of making light incident on the core layer; and
a detection unit capable of receiving light propagating through the core layer.

9. The optical concentration measuring device according to claim 8, wherein the light source makes an infrared ray having a wavelength of 2 µm or more and less than 10 µm incident on the core layer.

10. An optical waveguide comprising:
a core layer capable of propagating light and having a first portion having a first film thickness, a second portion having a second film thickness different from the first film thickness, and a third portion connecting between the first portion and the second portion,
wherein the first portion has a grating portion,
the second portion has a light propagation portion,
in the third portion, a film thickness is gradually increased from a small film thickness side toward a large film thickness side between the first portion and the second portion, and
the grating portion has an average film thickness that is larger than a film thickness of the light propagation portion.

11. The optical waveguide according to claim 10, wherein a maximum inclination angle of a gradually increased film thickness inclination is 10° or more and 45° or less in the third portion.

12. The optical waveguide according to claim 10, wherein an average inclination angle of a gradually increased film thickness inclination is 30° or less in the third portion.

13. An optical concentration measuring device comprising:
the optical waveguide according to claim 10;
a light source capable of making light incident on the core layer; and a detection unit capable of receiving light propagating through the core layer.

14. An optical waveguide comprising:
   a core layer capable of propagating light and having a first portion having a first film thickness, a second portion having a second film thickness different from the first film thickness, and a third portion connecting between the first portion and the second portion,
   wherein the first portion has a grating portion,
   the second portion has a light propagation portion,
   in the third portion, a film thickness is gradually increased from a small film thickness side toward a large film thickness side between the first portion and the second portion,
   the grating portion has a projection portion, and
   a film thickness of the projection portion is larger than a film thickness of the light propagation portion.

15. The optical waveguide according to claim 14, wherein a maximum inclination angle of a gradually increased film thickness inclination is 10° or more and 45° or less in the third portion.

16. The optical waveguide according to claim 14, wherein an average inclination angle of a gradually increased film thickness inclination is 30° or less in the third portion.

17. The optical waveguide according to claim 14, wherein the core layer is made of a single crystal.

18. The optical waveguide according to claim 14 further comprising:
   a protective film formed on at least a part of a surface of the core layer, having a film thickness of 1 nm or more and less than 20 nm, and having a refractive index smaller than a refractive index of the core layer.

19. The optical waveguide according to claim 18, wherein the protective film is a silicon nitride film or a silicon oxynitride film.

20. An optical concentration measuring device comprising:
   the optical waveguide according to claim 14;
   a light source capable of making light incident on the core layer; and
   a detection unit capable of receiving light propagating through the core layer.

* * * * *